United States Patent [19]

O'Neil

[11] 4,190,334
[45] Feb. 26, 1980

[54] NOSE PAD FOR EYEGLASS FRAMES

[76] Inventor: Roderick J. O'Neil, 655 Main St., Waltham, Mass. 02154

[21] Appl. No.: 937,489

[22] Filed: Aug. 28, 1978

[51] Int. Cl.$^2$ .............................................. G02C 5/02
[52] U.S. Cl. ......................................... 351/137; 2/13
[58] Field of Search ................. 351/82, 137, 132, 135, 351/88, 76, 80, 136, 138, 139, 126, 128, 44; 2/436, 13

[56] References Cited

U.S. PATENT DOCUMENTS

| | | | |
|---|---|---|---|
| 1,910,460 | 5/1933 | Boutelle | 351/128 |
| 2,023,469 | 12/1935 | Grier | 351/82 |
| 2,026,087 | 12/1935 | Grier | 351/82 |
| 2,032,843 | 3/1936 | Grier | 351/82 |
| 2,694,263 | 11/1964 | Francis et al. | 351/44 |
| 3,345,121 | 10/1967 | De Angelis | 351/128 |
| 3,365,263 | 2/1965 | Allen | 351/155 |
| 3,431,045 | 3/1969 | Dietrich | 351/137 |
| 3,923,385 | 12/1975 | Ahern | 351/138 |
| 4,032,223 | 6/1977 | Bradley | 351/132 |
| 4,045,137 | 8/1977 | Bradley | 351/137 |

Primary Examiner—John K. Corbin
Assistant Examiner—B. W. de los Reyes
Attorney, Agent, or Firm—Morse, Altman, Oates & Bello

[57] ABSTRACT

An inflated floating bridge piece is provided for use on eyeglass frames to increase comfort, reduce slippage and allow for height adjustment of the glasses. The bridge piece is in the form of a resilient, hollow member having one or more air chambers in an inverted U shape adapted to fit over the bridge of the nose in place of conventional eyeglass bridges. The inner wall of the bridge is thinner than the outer wall to provide control over bridge pressure and an adjustment plate bears against the cross piece to selectively adjust the pressure in the chamber or chambers.

6 Claims, 18 Drawing Figures

NOSE PAD FOR EYEGLASS FRAMES

BACKGROUND OF THE INVENTION

1. Field of the Invention

This invention relates generally to nose pieces for eyeglasses and more particularly is directed towards a new and improved, variable pressure, inflated bridge piece for eyeglass frames.

2. Description of the Prior Art

A conventional eyeglass frame is supported on the bridge of the nose by means of a bridge piece which may be an integral part of the frames or may be in the form of pads fixed or on a swivel to provide some self adjustment between the frames and the nose. In either event, bridge pieces on conventional eyeglass frames have a number of disadvantages in that frequently they will allow the frame to slip down the nose so that the lenses move out of optimum optical position with respect to the eyes. Furthermore, conventional bridge pieces tend to be uncomfortable particularly after wearing the glasses for a long period of time and most such standard pieces cannot be adjusted as to width and height with the result that, unless the glasses are fitted properly and exactly at the outset, there is very little that can be done to correct for a poor fit.

While various types of devices have been proposed to improve the comfort and to provide some form of adjustability, none has been satisfactory from the standpoint of practicality, simplicity, cost and effectiveness.

Accordingly, it is an object of the present invention to provide a new and improved nose piece for eyeglass frames. Another object of this invention is to provide a nose piece for an eyeglass frame which is both comfortable and adjustable to permit the frames to be raised or lowered selectively for optimum lens position. A further object of this invention is to provide a nose piece for eyeglass frames which is comfortable, adjustable, simple and low cost and adapted to prevent the glasses from slipping along the nose.

SUMMARY OF THE INVENTION

This invention features a nose piece for eyeglass frames, comprising a generally inverted U-shaped hollow device the walls of which are of a resilient, flexible material. The device is contoured to conform generally to the bridge of the nose and is attached to the eyeglass frame. The device is charged with air or other fluid and the configuration may be altered by selectively changing the pressure thereof. The inner walls against the bridge of the nose are thinner than the walls on the exterior of the device to localize and control the shape of the device according to applied pressure. A plate bears against the top part of the device and may be pressed selectively against the device to control the pressure of the fluid therein.

DETAILED DESCRIPTION OF THE PREFERRED EMBODIMENTS

Figure 1:
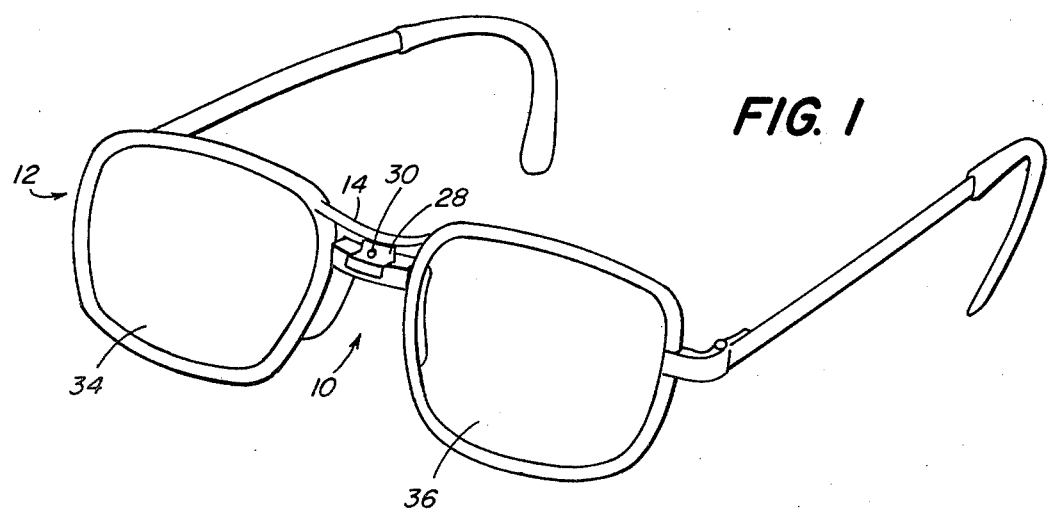
FIG. 1 is a view in perspective of a pair of eyeglasses fitted with a bridge device made according to the invention.
Figure 3:
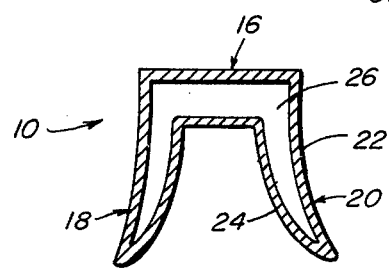
FIG. 3 is a sectional view in side elevation thereof.
Figure 2:
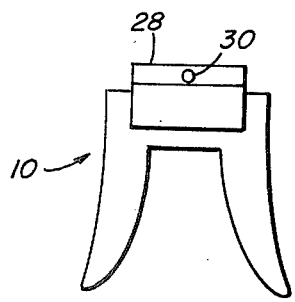
FIG. 2 is a view in front elevation of a bridge device made according to the invention.

Referring now to the drawings and to FIGS. 1 through 3 in particular, the reference character 10 generally indicates a nose piece mounted to the frame of a pair of eyeglasses 12. The nose piece 10, in the illustrated embodiment, is attached to the frame's bridge portion 14 and is adapted to support the glasses 12 on the nose of the wearer.

In the preferred embodiment, the nose piece 10 is a hollow resilient device of an inverted U shape formed with a transverse cross-portion 16 and a pair of depending outwardly diverged curved legs 18 and 20 of equal length. The device is comprised of a relatively thick outer wall 22 and a relatively thin inner wall 24 defining a sealed chamber 26 therebetween. The device is dimensioned to fit neatly to the bridge of the glasses with the legs 18 and 20 extending between the lens frames in place of the usual nose pad which may be formed integral with the frames or mounted thereon according to the particular style.

The nose piece 10 is mounted to the bridge 14 by any one of a variety of means. In the mounting arrangement of FIGS. 1, 2 and 3, the cross portion 16 is attached to the bridge 14 by means of an offset clip 28 connected to the bridge by means of a screw 30 while the remaining portion of the device 10 is secured to the frames by bonding with cement or the like. In practice the entire device 10 could be attached to the frames by a suitable adhesive.

The chamber 26 is filled with a fluid, preferably air, and sealed. The pressure of the fluid should be sufficient to position the glasses 12 at a normal wearing level and, under such conditions, the device would have a shape substantially as shown in FIG. 3.

The internal pressure in the chamber 26 may be increased or decreased in order to expand or contract the inner wall 24 by adjusting the screw 30 so as to cause the clip 28 to press against the upper portion of the device 10 thereby increasing the fluid pressure, or by backing off on the screw 30 so as to relieve the pressure in the chamber 26. Insofar as the inner wall 24 is thinner than the outer wall 22, any change in pressure in the chamber 26 will cause the inner wall 24 to undergo more of a change in shape than the outer wall 22. Thus, the contour of the wall 24 is able to be closely controlled while the outer wall 22 remains substantially fixed in contour.

By being able to selectively control the pressure in the chamber 26, which results in a selective change of the inner wall contour 24, particularly along the legs 18 and 20, it is possible to adjust the height of the glasses 12 on the nose of the wearer. Height adjustment capability is important in order to be able to optically center the glasses with respect to the eyes of the wearer and to compensate for any minor errors that may result either in the manufacture of the frames or taking measurements when ordering new frames. It also allows for adjustment because of physical changes that may take place on the nose of the wearer as frequently accompanies weight loss or gain which the wearer may experience.

Figure 15:
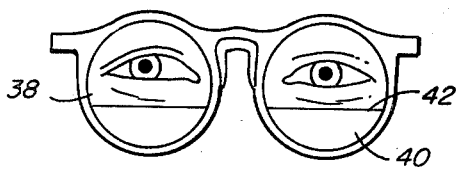
FIG. 15 is a front view showing a pair of eyeglasses equipped with a nose piece made according to the invention and in a normal position with respect to the eyes of the wearer.
Figure 16:
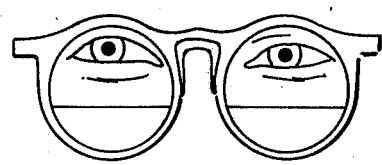
FIG. 16 is a view similar to FIG. 15 showing the glasses in a lowered position.
Figure 17:
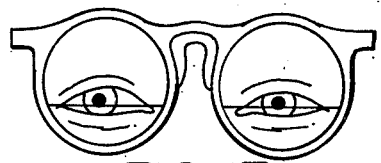
FIG. 17 is a view similar to FIG. 15 showing the glasses in a raised position, and, FIG. 18 is a view similar to FIG. 15 but showing the glasses in a laterally shifted position.
Figure 9:
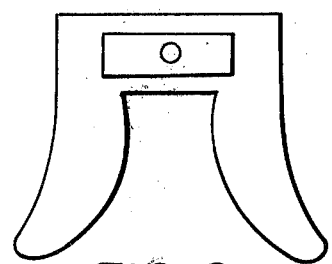
FIG. 9 is a view similar to FIG. 8 showing the device under a condition of increased pressure.
Figure 10:
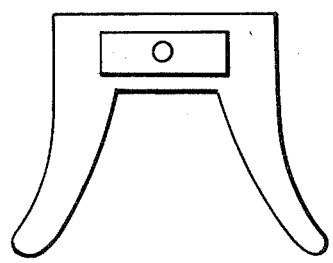
FIG. 10 is a view similar to FIG. 8 but showing the pad under a reduced pressure condition.

In any event, the height of the glasses may be raised or lowered as suggested in FIGS. 15 through 17 by selectively changing the pressure in the chamber 26 which will cause the gap between the legs 18 and 20 to increase or decrease according to the chamber pressure. In FIG. 15 for example, the eyeglasses are shown in a normal wearing position with the eyes at the optical center of eyeglass lenses 34 and 36. Positioning of the glasses with respect to the eyes is particulary important where the glasses are of the bifocal type. As shown in FIGS. 15 through 17, bifocal lenses comprise upper portions 38 used for normal viewing while lower portions 40 are used for reading and separated from the upper portion by a line 42 which may be visible or semi-visible depending upon the glass design. In some instances the wearer may wish to raise the glasses somewhat in order to position the reading portions 40 of the lenses closer to the optical axis of the eyes, for example, when the wearer is doing a substantial amount of reading or close work and does not wish to look down through the lens portions 40 as would be necessary with the glasses in the normal position of FIG. 15. In such an event, the frames may be raised by increasing the pressure in the chamber 26 which is done by tightening the screw 30. The increase in pressure will cause the inner walls of the legs to distend as shown in FIG. 9, reducing the gap between the legs so that the device will sit higher on the nose of the wearer and bring the glasses into the position shown in FIG. 17. In other situations such as sports, ladder and roof work, the wearer may wish to lower the glasses into a position such as shown in FIG. 16. This position may be achieved by relieving the pressure in the chamber 26 by backing off on the screw 30.

By reducing the pressure, the thickness of the legs 18 and 20 is reduced, thereby increasing the gap between the legs and allowing the device, with the frame, to drop lower on the nose of the wearer. Thus, it is possible to raise and lower the glasses from a normal wearing position or to correct for a misfit or to compensate for changes in the physiognomy of the wearer. The adjustment may be done by the dispenser or by the wearer himself through adjustment of the screw 30. The device may be manufactured from a suitable resilient material such as rubber or various types of resilient elastomeric plastics presently available.

In practice, the inner curved faces of the legs 18 and 20 may be textured to some extent in order to provide a better grip on the nose of the wearer and thereby reduce slipping of the glasses along the nose.

Figure 6:
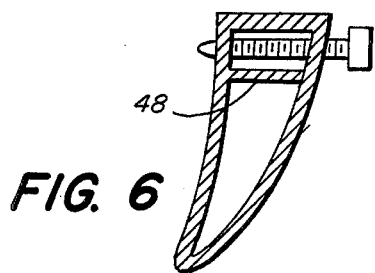
FIG. 6 is a sectional view in side elevation of the FIGS. 4 and 5 embodiment.
Figure 7:
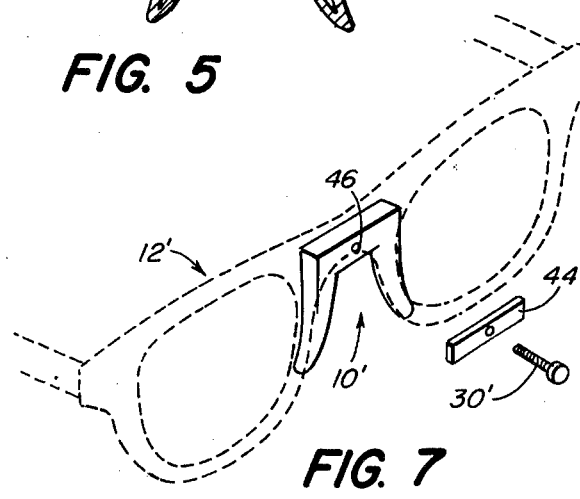
FIG. 7 is a exploded perspective view of the device shown installed.

Referring now to FIGS. 6 and 7 of the drawings, there is illustrated a modification of the invention and, in this embodiment, a nose pad 10' is attached to the bridge of the glasses 12' by means of a screw 30', passing through a plate 44 which spans across the upper portion of the pad 10' and through a passage 46 formed through cross portion of the pad and sealed from the chamber within the pad by means of an annular wall or sleeve 48 within the device. The screw 30' is threaded to a tapped hole formed in the bridge of the frames and by means of which munipulation of the screw 30' will allow the pressure to be increased or decreased selectively within the pad.

Figure 4:
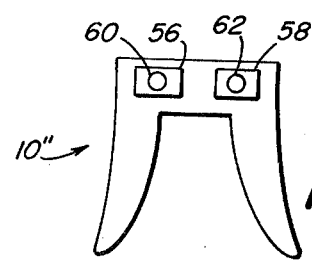
FIG. 4 is a view in side elevation showing a modification thereof.
Figure 5:
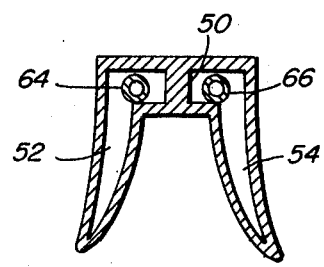
FIG. 5 is a sectional side elevation showing yet another modification of the invention.

Referring now to FIGS. 4 and 5, there is illustrated another modification of the invention and, in this embodiment, a nose pad 10" is of a configuration similar to that of the principal embodiment with the exception that an interior wall 50 in the cross portion divides the interior of the device into a pair of chambers 52 and 54, the pressure in which may be individually altered. In this embodiment two separate pressure plates 56 and 58, each with an adjustment screw 60, 62 are provided for selectively controlling on an individual basis the pressure in each of the chambers 52 and 54. The screws 60 and 62 pass through sealed sleeves 64 and 66 to threadably engage the bridge of the frame.

Figure 18:
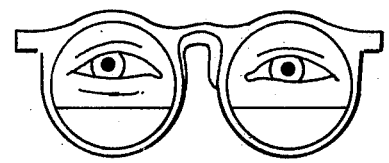
Figure 8:
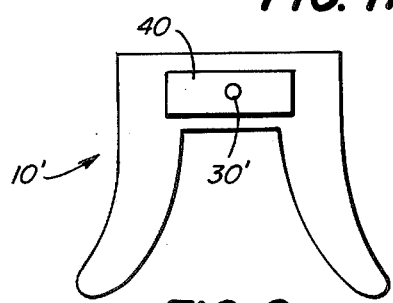
FIG. 8 is a view in front elevation showing a normal condition of the nose pad.

It will be understood that by selectively manipulating each of the screws 60 and 62, the pressure in each of the chambers 52 and 54 may be regulated. The pressure in both chambers may be kept the same or the pressure in one may be greater than that in the other, in which instance each leg of the device will take a different configuration with the inner wall of one distending to an extent greater than the inner wall of the other. This flexibility in adjustment allows glasses equipped with such a device not only to be raised and lowered on a selective basis, but also to be shifted laterally to one side or the other. In certain instances a person being fitted for glasses may have an irregularity in the shape of his nose which would prevent proper fitting of a normal pair of glasses. Any such irregularity can be compensated for as suggested in FIG. 18 by increasing the pressure in one chamber over that of the other, causing the inner wall to distend on one side and reduce on the other, thereby shifting the entire lens frame to one side or the other and allowing the lenses to be centered relative to the eyes irrespective or the shape of the nose.

Figures 11, 12, 13, 14:
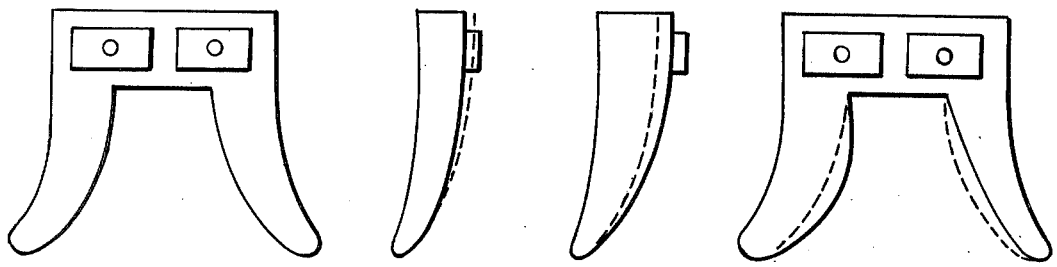
FIG. 11 is a view in front elevation showing a modified nose pad under normal pressure condition.
FIG. 12 is a view in side elevation thereof showing the nose pad under a reduced pressure condition.
FIG. 13 is a view in side elevation showing the modified nose pad under an increased pressure condition.
FIG. 14 is a view in front elevation showing the modified nose pad under an increased pressure condition.

In FIGS. 11 through 14 there are shown views of the FIG. 4 device under various pressure conditions for the two legs. For example, in FIG. 11 the device is shown under normal pressure while in FIG. 12 the device is shown under reduced pressure. In FIG. 13 the device is shown at greater than normal pressure while in FIG. 14 the left leg is shown in full line at increased pressure while the right leg is shown in full line at decreased pressure. The dotted line in FIG. 14 represents the normal contour of the inner wall of the leg.

The device provides a simple yet very useful means for optimizing the fit of glasses and to allow adjustment thereof either on a temporary or on a permanent basis. The dispenser or wearer is provided great flexibility in fitting glasses to the patient and makes possible many adjustments not heretofore possible.

While the invention has been described with particular reference to the illustrated embodiments, numerous modifications thereto will appear to those skilled in the art. For example, while several means have been shown for mounting the nose piece to the glasses, obviously a wide variety of mounting means may be provided such as straps wrapped about the bridge and the cross portion of the device or many other measures may be utilized to advantage.

Having thus described the invention, what I claim and desire to obtain by Letters Patents of the United States is:

1. A nose piece for use with a pair of eyeglasses having a bridge extending between the lenses of said eyeglasses, comprising
    (a) an inverted U-shaped hollow member adapted to contain a charge of fluid sealed therein,
    (b) said member formed with a hollow cross-portion mountable to said bridge and a pair of spaced, depending curved hollow legs extending one from each end of said cross-portion to engage the nose of a person wearing said eyeglasses,
    (c) the walls of said member being of an imperforate elastic material and the inner opposing walls of said legs being thinner than the outer walls thereof whereby said inner walls will expand and contract with changes in the pressure of said fluid to change the gap between said legs, and,
    (d) squeezing means engaging said cross-portion for selectively compressing said cross-portion to vary the pressure of said fluid.

2. A nose piece according to claim 1 wherein said fluid is air.

3. A nose piece according to claim 1 including an interior wall in said cross-portion dividing said member into a pair of separate chambers each containing a charge of fluid sealing therein, and said squeezing means includes separate portions individually engaging different sections of said cross-portion for selectively squeezing either end of said cross-portion.

4. A nose piece according to claim 1 wherein said squeezing means includes a rigid plate formed with at least one opening therein and engageable with said cross-portion and a screw extending through said opening and threadably engaging a cooperating tapped hole formed in said bridge.

5. A nose piece according to claim 1 wherein said cross-portion is formed with at least one opening therethrough and said squeezing means includes a screw adapted to extend through said opening and threadably engage said bridge.

6. A nose piece according to claim 5 including a substantially rigid plate formed with at least one opening therein for mounting between said cross-portion and the head of said screw.

* * * * *